US005894521A

United States Patent [19]
Conley

[11] Patent Number: 5,894,521
[45] Date of Patent: Apr. 13, 1999

[54] SYSTEM AND METHOD FOR ENCRYPTING SENSITIVE INFORMATION

[75] Inventor: Ralph F. Conley, Miamisburg, Ohio

[73] Assignee: Direct Business Technologies, Inc., Miamisburg, Ohio

[21] Appl. No.: 08/912,914

[22] Filed: Aug. 15, 1997

Related U.S. Application Data

[63] Continuation of application No. 08/683,362, Jul. 18, 1996, Pat. No. 5,793,870, which is a continuation of application No. 08/249,330, May 26, 1994, Pat. No. 5,568,556.

[51] Int. Cl.$^6$ .................................................. H04L 9/00
[52] U.S. Cl. .................................... 380/54; 380/24
[58] Field of Search .................................. 380/24, 54

[56] References Cited

U.S. PATENT DOCUMENTS

| | | | |
|---|---|---|---|
| 4,138,058 | 2/1979 | Atalla | 380/54 |
| 4,408,203 | 10/1983 | Campbell | 380/24 |
| 4,697,072 | 9/1987 | Kawana | 380/24 |
| 4,743,747 | 5/1988 | Fougere et al. | 235/494 |
| 4,864,616 | 9/1989 | Pond et al. | 380/24 |
| 4,879,747 | 11/1989 | Leighton et al. | 380/24 |
| 4,926,480 | 5/1990 | Chaum | 380/24 |
| 5,020,411 | 6/1991 | Rowan | 89/1.11 |
| 5,136,644 | 8/1992 | Audebert et al. | 380/24 |
| 5,241,600 | 8/1993 | Hillis | 380/23 |
| 5,321,749 | 6/1994 | Virga | 380/18 |
| 5,337,358 | 8/1994 | Axelrod et al. | 380/23 |
| 5,337,361 | 8/1994 | Wang et al. | 380/51 |
| 5,384,846 | 1/1995 | Berson et al. | 380/23 |
| 5,420,924 | 5/1995 | Berson et al. | 380/23 |
| 5,436,970 | 7/1995 | Ray et al. | 380/54 |
| 5,568,556 | 10/1996 | Conley | 380/54 |
| 5,577,121 | 11/1996 | Davis et al. | 380/54 |
| 5,577,125 | 11/1996 | Salashour et al. | 380/54 |

*Primary Examiner*—Salvatore Cangialosi
*Attorney, Agent, or Firm*—Jacox, Meckstroth & Jenkins

[57] ABSTRACT

This invention relates to a system and method for converting encryption data into at least one preselected image in a manner such that, for example, the entity converting the encryption data into the at least one preselected image is not privy to the meaning or value of the sensitive information. The system and method comprises a display system having an encryption record for enabling a user to separate title and label information from data information and to encrypt the data information into a predetermined encrypted data set or format. The display system also includes an image area portion having a plurality of predetermined images for selecting at least one visual image to represent the predetermined encrypted data set. A converter may also be provided for converting the predetermined encrypted data set into the at least one visual image. The encryption record has a plurality of record areas for formatting and recording the encrypted data, a media area for identifying a medium for the at least one visual image and an encryption area for indicating whether the predetermined encrypted data set is confidential. The system also comprises a de-encrypter for de-encrypting the at least one visual image so that the visual image and the predetermined encrypted data set is de-encrypted for the entity providing the sensitive information. In one embodiment, the de-encrypter may include a plurality of labels for the entity to use in association with the at least one visual image.

27 Claims, 6 Drawing Sheets

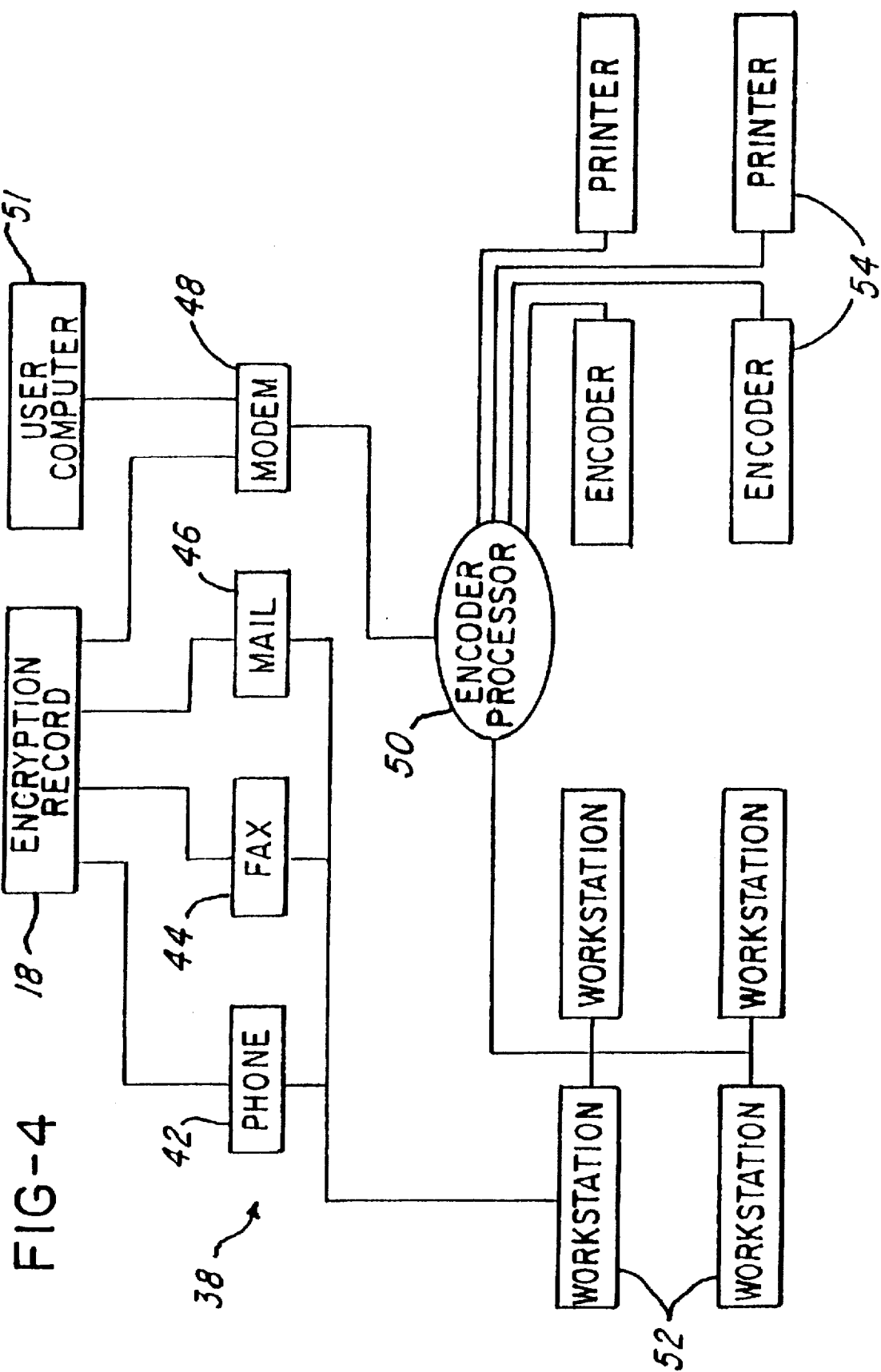

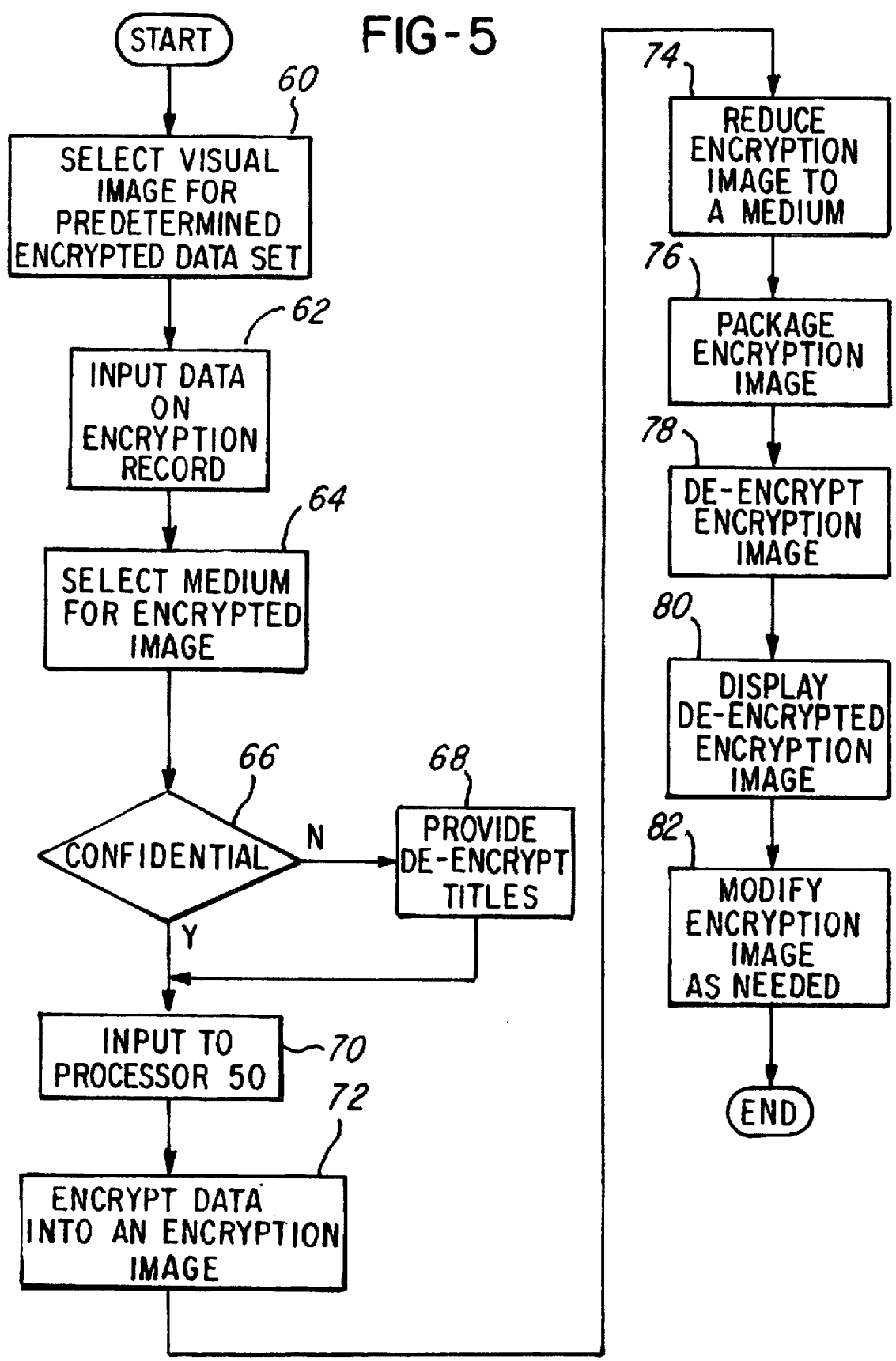

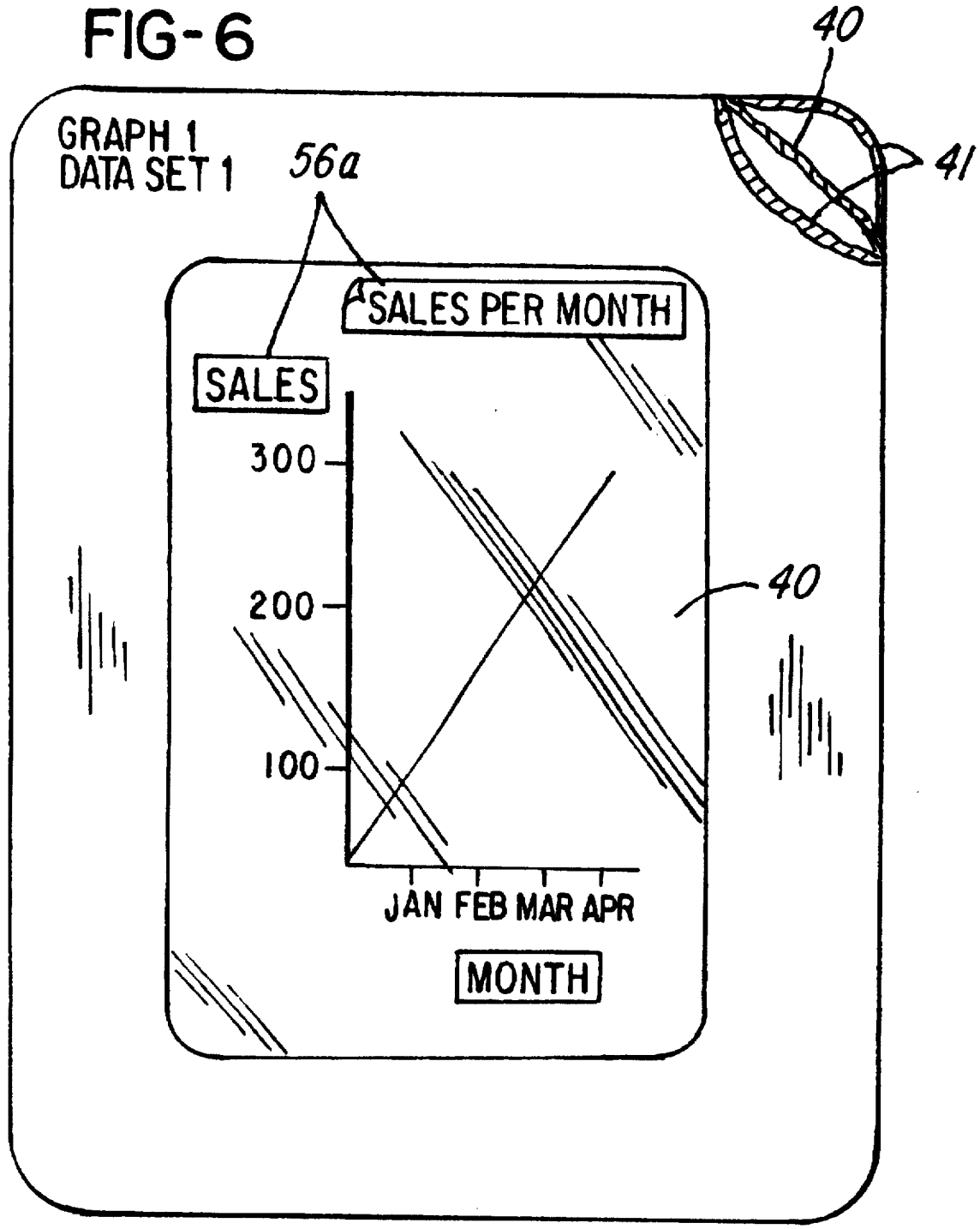

SYSTEM AND METHOD FOR ENCRYPTING SENSITIVE INFORMATION

RELATED APPLICATION

This is a continuation of application Ser. No. 08/683,362 filed Jul. 18, 1996, now U.S. Pat. No. 5,793,870 which is a continuation of Ser. No. 08/249,330 filed May 26, 1994, now U.S. Pat. No. 5,568,556 issued Oct. 22, 1996.

BACKGROUND OF THE INVENTION

1. Field of the Invention

This invention relates to a system and method for encrypting sensitive information, and more particularly, this invention relates to a system and method for encrypting sensitive information into a visual form so that it can ultimately be de-encrypted by the entity providing the sensitive information.

2. Description of Related Art

In recent years, the use of visual images, such as graphs, charts and the like, have been used to represent information or data because the visual representation is oftentimes more readily comprehensible. One disadvantage of prior art systems and methods is that they could not easily be used with sensitive information, such as confidential or proprietary data or data which is desirable to be encrypted into an encoded form because the information would often have to be provided to employees or entities which the provider of the sensitive information may not wish to know about. Consequently, a user who is dependent upon, for example, an employee or third party for converting sensitive information into a visual image would be reluctant to disclose such sensitive information to such employee or consultant.

What is needed, therefore, is a method and system for enabling sensitive information to be encrypted into visual image form in a manner such that the information is not understandable to the person or entity generating the visual image.

SUMMARY OF THE INVENTION

This invention overcomes the problems in the prior art by providing a system and method for encrypting sensitive data into an encrypted image which can be subsequently de-encrypted by a user.

In one aspect of this invention there is provided a display system which comprises an encryption record member for encrypting data into a predetermined encrypted data set, an image area portion having a plurality of images for selecting at least one visual image to represent the predetermined encrypted data set, a convertor for converting the predetermined encrypted data set into said at least one visual image, the encryption record having a plurality of record areas for recording said encrypted data and also having a media area for identifying a medium for the visual image, and a de-encrypter for de-encrypting the at least one visual image.

In another aspect of this invention, there is provided a method for converting encryption data into at least one preselected image, which comprises the steps of encrypting the encryption data into a predetermined form, selecting the at least one preselected image, and converting the encryption data into the at least one preselected image.

It is an object of this invention to provide a system and method for enabling a user to encode or encrypt sensitive information onto an encryption record so that the information thereof is generally not discernible by others.

Another object of this invention is to provide a system and method which permits sensitive information of a first entity to be converted into a visual image by second entity and subsequently de-encrypted by the first entity.

Still another object of this invention is to provide an encryption kit which enables the first entity to encrypt sensitive information or data into a predetermined data set or format for transformation into an image by a second entity and thereafter de-encryption by the first entity.

Yet another object of this invention is to provide a system and method for enabling an entity to process sensitive information of a second entity in a manner such that the sensitive information is not meaningful to the first entity.

These advantages and others may be more readily understood in connection with the following specification, claims and drawing.

BRIEF DESCRIPTION OF THE DRAWING

FIG. 4 is a view of an encrypter/converter;

FIG. 5 is a general schematic view showing an encryption method and process in accordance with one embodiment of the invention; and FIG. 6 is a view of the visual image which has been de-encrypted in accordance with one embodiment of the invention.

DETAILED DESCRIPTION OF THE INVENTION

Figure 1:
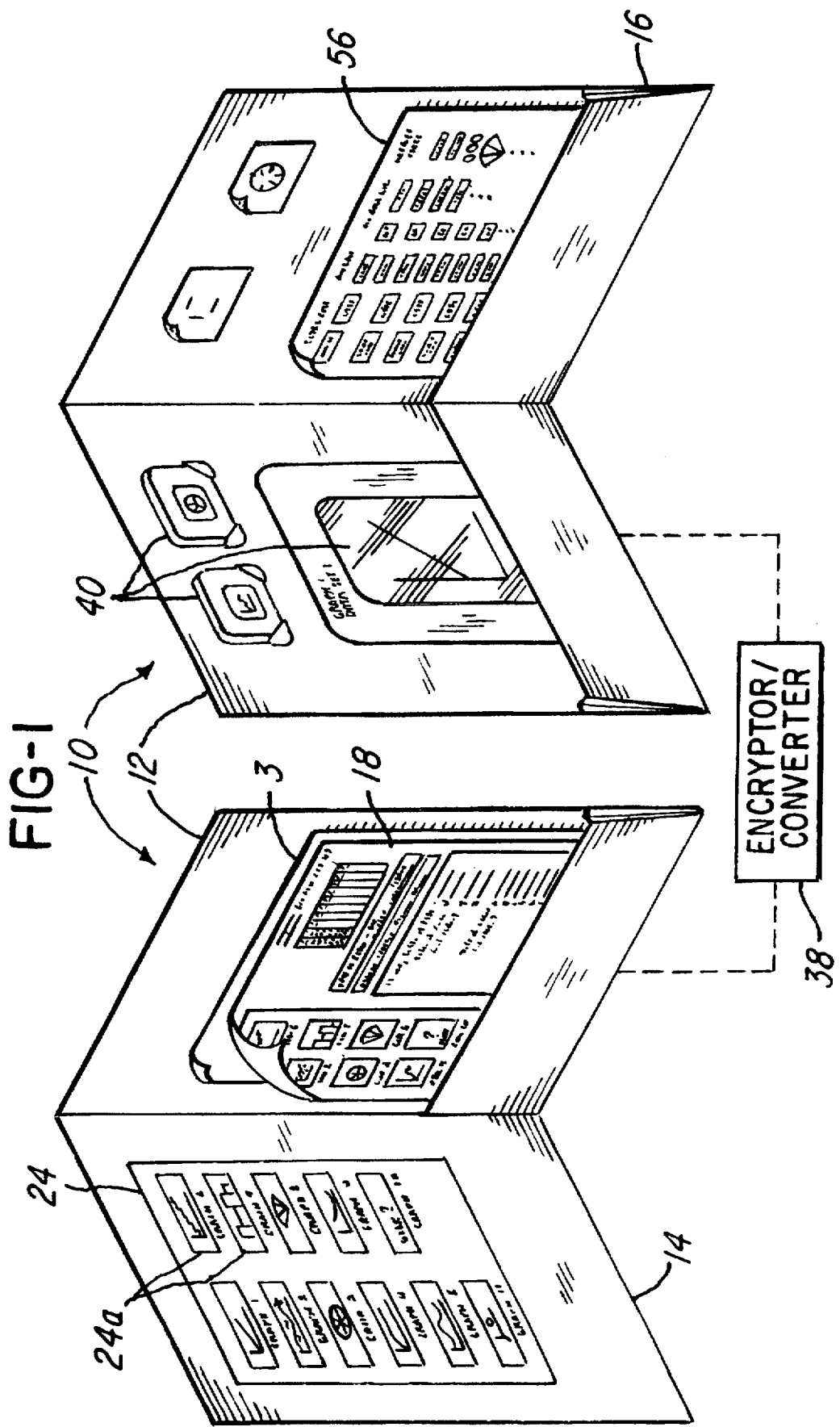
FIG. 1 is a view of an encryption system according to one embodiment of the invention.
Figure 2:
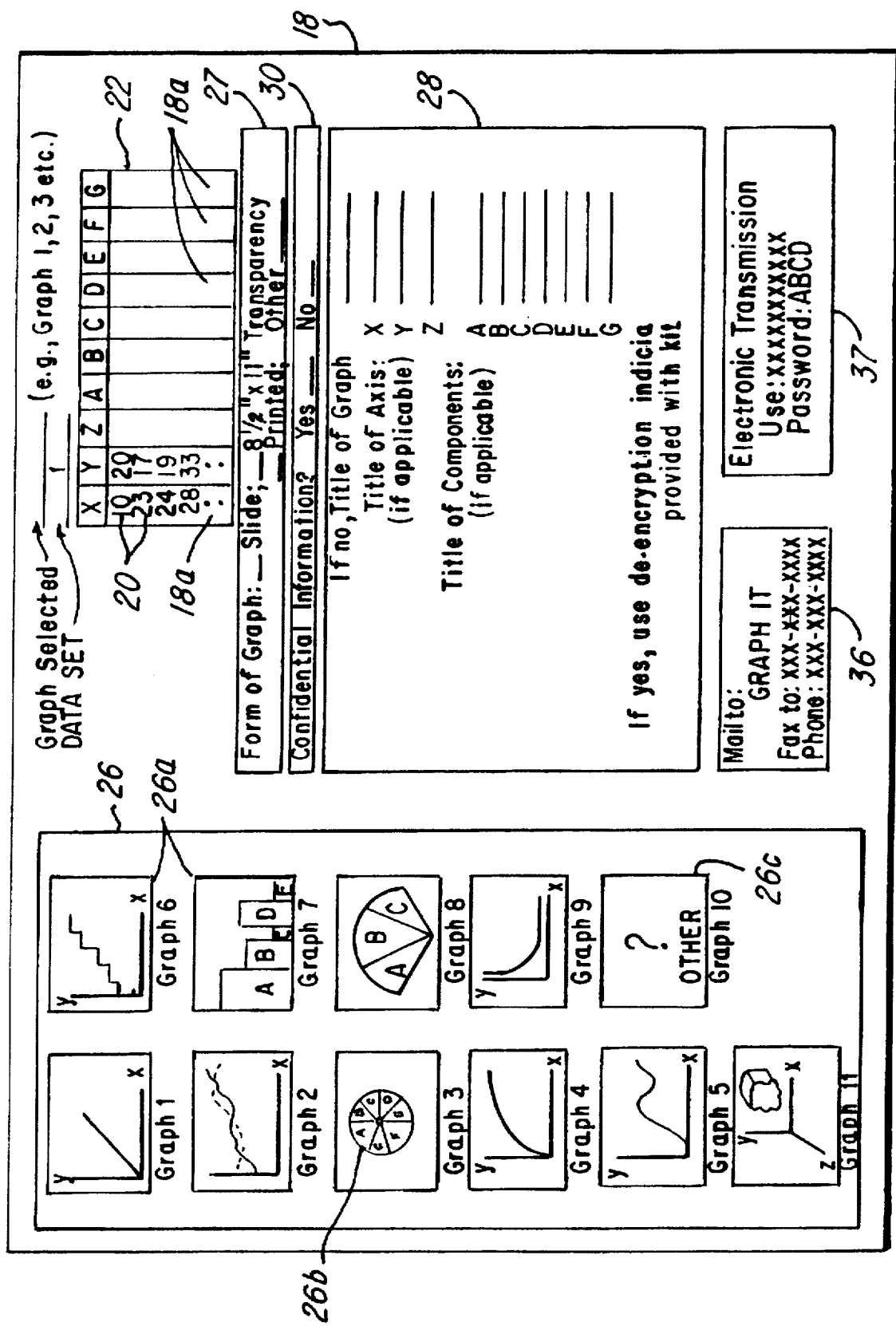
FIG. 2 is a view of an encryption record illustrating various formats for formatting data, such as encryption data.
Figure 3:
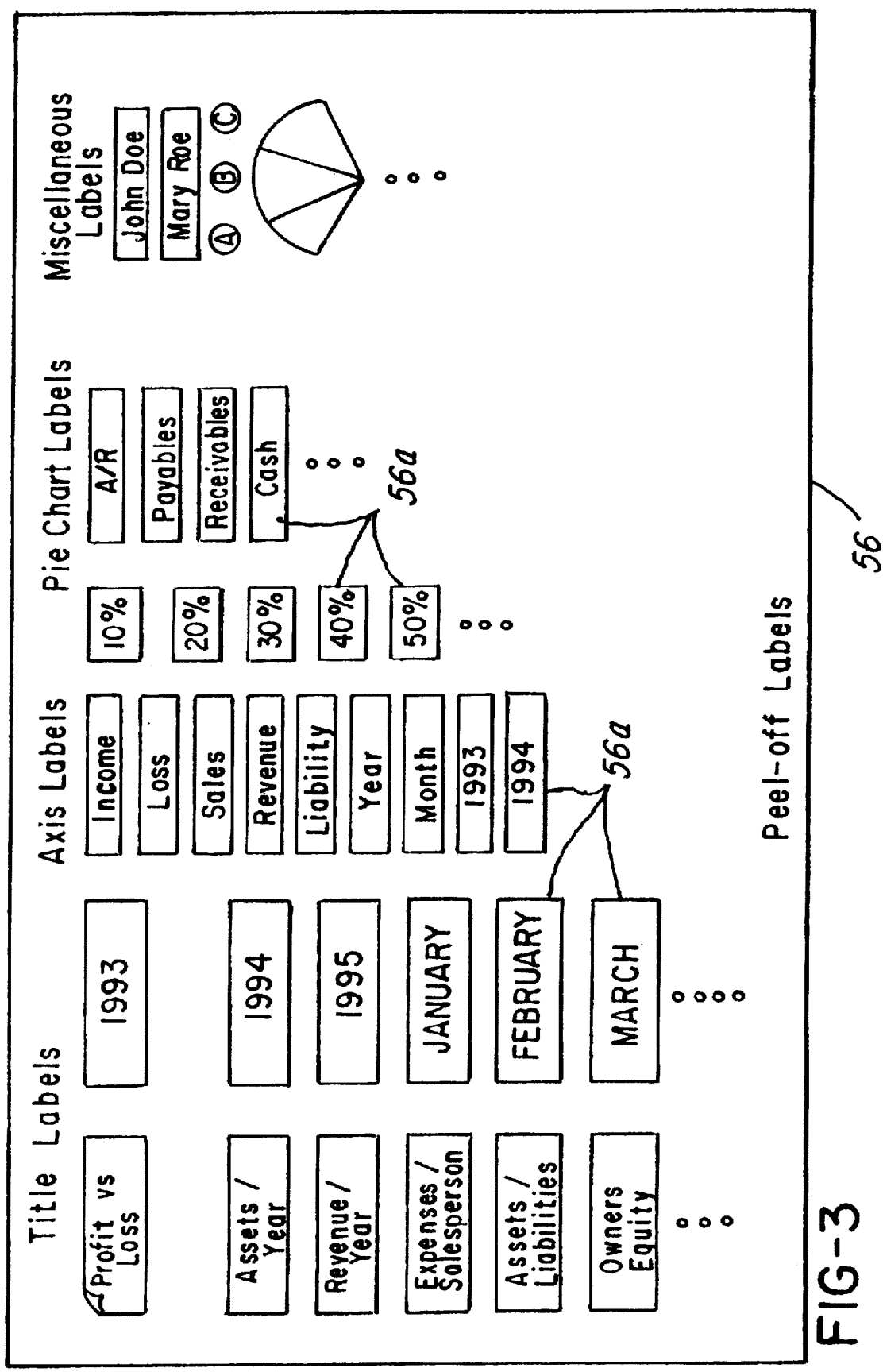
FIG. 3 illustrates encryption indicia which may be used to de-encrypt a visual image.

Referring now to FIGS. 1–6, a display system 10 is illustrated comprising a kit 12 having an encryption portion 14 and a de-encryption portion 16. As best shown in FIGS. 1 and 2, the display system 10 comprises an encryption record 18 which may be either permanently or removably located in the encryption portion 14. The function of the encryption record 18 is to permit encryption data 20 (FIG. 2) to be encrypted into a predetermined encrypted data table or set 22. The encryption data 20 may be any suitable data such as financial, personal, confidential or proprietary data which is desired to be encrypted.

The encryption portion 14 also comprises a selection area 24 or means for selecting at least one visual image 24a, such as a graphical image, to represent the predetermined encrypted data set 22. The selection area 24 may be an integral portion of the encryption portion 14 or it may be removably or detachably secured thereto. Notice that the encryption record 18 comprises an image area 26 having a plurality of images 26a which generally correspond to the visual images 24a of the selection area 24 of encryption portion 14.

As best illustrated in FIG. 2, the encryption record 18 comprises a plurality of record areas 18a for recording the encryption data 20 into the predetermined encrypted data set 22. The encryption record 18 may also comprise media indicia 27 for identifying a desired medium for presenting the visual image 24a. In addition, the encryption record 18 may also comprise an encryption area 30 for indicating whether the predetermined encryption data set 22 is confidential, proprietary or is information which is desired to be encrypted.

In a preferred embodiment, the image area 26 may be located on the encryption record 18 which may be, for example, a single or multi-page document. This facilitates selecting at least one visual image 26a to represent the predetermined encrypted data set 22 and also facilitates organizing the encryption data 20 into the predetermined encrypted data set 22.

As best illustrated in FIG. 2, the encryption record 18 may also comprise a label or title area 28 for identifying appropriate information corresponding to the encryption data 22 and visual image 24a selected. For example, such information 28 may comprise a title for the visual image 24a, a title of an axis, a title of various components of the visual image (such as the portions A–G of the pie chart 26b). In the embodiment being described, it is preferable that such information 28 be provided when it is, for example, not confidential, proprietary or the like.

If the encryption data 20 is confidential, proprietary or data which is desirable to be encrypted, then de-encryption indicia 56 should be used as described below.

The encryption record 18 may also comprise a communication area 36 and transmission area 37 for identifying an appropriate entity to whom the encryption data 20 should be communicated or transmitted for processing.

The display system 10 also comprises an encrypter, converter, or converter means for converting the predetermined encrypted data set 22 into an encrypted visual image 40, like the graph or encrypted image 40 shown in FIG. 6. Although the encrypted image 40 may be embodied, for example, on paper, plastic, or film, it should be appreciated that this could very well be provided on a diskette or electronically provided so that a processor or computer system can receive and display the visual image 40.

The converting means 38 may be configured as best illustrated in FIG. 4 where the encryption record 18 is communicated, for example, via phone 42, via facsimile 44, mail 46 and/or modem 48 for input into an encoder/processor 50. The information may be inputted using a work station 52. Once the information on the encryption record 18 is inputted into processor 50 the information may be manipulated using one or more work stations 52 and ultimately electronically encoded into the encrypted image 40 using software resident on the processor 50. The electronically encrypted image 40 may then be displayed on a monitor or reduced to a tangible form on one or more printers or encoders 54.

In the embodiment being described, each visual image 26a has a corresponding specification or formula which is stored in memory in the encoder processor 50. The information on the encryption record 18 may be inputted into the encoder processor 50 via the work station 52 and subsequently encoded into the encrypted image 40 using the encoder processor 50. Thereafter, the electronically encrypted image 40 may then be processed into a visual form such as on a print medium, like paper, film, or plastic. Alternatively, the electronically encrypted image 40 may be provided in magnetic media, such as a diskette or tape, for displaying on a display associated with a computer terminal.

In the embodiment being described, one suitable encoder processor 50 may be the NEC RLSC server 75/150 megahertz available from NEC Corporation or the AT&T Pentium 60 megahertz available from AT&T Corporation. The work stations 52 may comprises a COMPAQ work station having a 486 Intel processor which is available from COMPAQ Corporation. A suitable visual image encoder 54 may include a Tektronics Thermal Printer available from Tektronics Corporation and/or an HP Desk Jet 560C available from Hewlett Packard Company. In the embodiment being described, suitable software for converting the predetermined encrypted data set 22 into the encrypted image 40 may include using Microsoft Office Access 2.0 (database) and Microsoft Office Excel 5.0 (for creating specifications such as graphs and charts) run on DOS/Windows operating system for the work stations 52 and a Windows NT operating system for the encoder processor 50. These products are available from Microsoft Corporation of Redmond, Wash.

After the converter 38 has encoded the predetermined encrypted data set 22 into the encrypted image 40,. the encrypted image 40 may be packaged in any suitable manner, such as using a paper or plastic frame or border 41 which may be useful when the encrypted image 40 is located on a medium such as paper, film or transparency.

The display system 10 further comprises means for de-encrypting or a de-encrypter 56 for de-encrypting the encryption image 40 so that the predetermined encrypted data set 22 and associated visual image 40 becomes de-encrypted. In the embodiment being described, the de-encrypter 56 comprises de-encrypting indicia comprising a plurality of labels or identifiers 56a (FIG. 3) for labeling and identifying the encrypted image 40 so that the predetermined encrypted data set 22 represented by the encrypted image 40 becomes de-encrypted. For example, the encrypting indicia record 56 may comprise a plurality of opaque or transparent labels which can be placed directly on the encrypted image 40 after it is embodied on one or more of the print medium mentioned above as shown in FIG. 6. It should be appreciated that the de-encrypting indicia 56 could comprise any suitable means for identifying or labeling the encrypted image 40 so that the predetermined encryption data set 22 represented by the encrypted image 40 will be de-encrypted. Also, a generic set of indicia may be provided so that a user can de-encrypt the visual image 40. As best illustrated in FIG. 1, the de-encrypter 56 or a photocopy 3 thereof may be provided with the encryption portion 16 or an indicia record 34 corresponding thereto may be provided with the encryption portion 14 of kit 12.

A method or process for converting the encryption data 20 into the encrypted image 40 will now be described in relation to FIG. 5. A visual image 24a from the image selection area 24 on encryption portion 14 of kit 12 is selected (block 60) as a desired graph, for example, to represent the encryption data 20. The encryption data 20 is then input or encoded onto the encryption record 18 (FIG. 2). It may be desirable at this time to identify (block 64) on encryption record 18 the medium on which the encrypted image 40 will be provided. Next, it may be desirable to identify on the encryption record 18 whether the encryption data 20 is, for example, proprietary or confidential at decision point 66. If the encryption data 20 is not proprietary or confidential, then it may not be necessary to encrypt the data into the encrypted image 40, but rather, it may be desirable to provide the encrypted image 40 in a de-encrypted form. Thus, at block 68, the various titles of the axis and components associated with the graph selected (for example, "assets", "liabilities", "profit", "year", "loss", etc.), would be identified in the title information area 32 of encryption record 18. If the encrypted data 20 is confidential, proprietary or otherwise desirable to encrypt into a form which is not generally discernible, then the title information area 32 is not completed on the encryption record 18.

Once the encryption record 18 is completed, the predetermined encrypted data set 22 and the information regarding the visual information 26a selected may be provided to another entity or person who may input (block 70) the data set 22 into processor 50 indirectly using work stations 52, for example. Alternatively, the entity performing the encryption may input the information directly into processor 50 using modem 48. Processor 50 then transforms (block 72) the predetermined encrypted data set 22 into the encrypted image 40. The encrypted image 40 is then reduced (block 74) into a medium, such as on a diskette, on paper, on transparency or film. The encrypted image 40 may then be packaged at block 76, for example, using an appropriate frame or border as desired. The encrypted image 40 may then be provided to the owner of the encryption data 20 who may then utilize the de-encrypter 56 to de-encrypt (block 78) the encrypted image 40 by, for example, applying encryption indicia in the form of labels 56a to the encrypted image 40. As mentioned earlier herein, the encryption indicia could be provided electronically so that when the encrypted image 40 is displayed, for example, on a computer display, the encrypted image 40 has electronic labels and is therefore visually de-encrypted. Thus, for example, if the encrypted image 40 is a graph (such as the graph 1 shown in the image selection area 26), the graph will have appropriate labels for the X axis and Y axis so that the encryption data 20 will appear de-encrypted. As shown in FIG. 6, if the visual image 40 is located in a print medium, then the labels 56a may be placed directly on the medium. As indicated at block 80, the de-encrypted image 40 may then be displayed or viewed.

Advantageously, this invention provides a system and method for encoding encryption data into a visual image, such as a graphical image, so that only the entity providing the encryption data will be able to discern what the visual image 40 represents. This invention also permits others, whether they are employees or independent third parties, to process sensitive information into image data without having knowledge as to what the data represents. This facilitates, for example, maintaining the confidentiality and secrecy of the encryption data 20 while it is being transformed into the encrypted image 40.

While the invention has been described with reference to a specific embodiment, various changes or modifications in the invention may occur to those skilled in the art without departing from the spirit or scope of the invention. For example, the system and method could be entirely performed electronically so the encrypted images are displayed on a display. The processor 50 can also be programmed to provide a menu of predetermined visual images 24a from which to choose. The processor may also generate the encryption record 18 for entering the encryption data 20. The images 24a and encryption record 18 may then be sent, via modem 48, to a user computer 51 for entering the selected image 24a and encryption data 20 onto the encryption record 18. The processor 50 would then generate the encrypted image 40 and transmit the encrypted image 40 to the user via the modem 48. The de-encryption indicia 56a may also be provided by processor 50 via modem 48 to the user's computer 51 so that the user can electronically select and position the indicia 56a, for example, using a mouse.

The user may print the de-encrypted image 40 in an appropriate print medium. Alternatively, the user may use the encryption indicia 56a to de-encrypt the image 40 as described above. Also, it should be appreciated that the encoder processor 50 may be provided with some standard predetermined graphical forms which are represented in the selection area 24 (FIG. 1) and image area 26 (FIG. 2). In addition, as shown by graph 24b in FIG. 2, a user may define a unique graph, for example, for representing the predetermined encryption data set 22, in which case the characteristics of such graph would be input into encoder processor 50 so that the encoder processor 50 can generate a corresponding encrypted image 40 as described earlier herein.

The above description of the invention is intended to be illustrative and not limiting, and it is not intended that the invention be restricted thereto but that it be limited only by the true spirit and scope of the appended claims.

What is claimed is:

1. A recording system comprising:

a record for display at a user computer for receiving data to provide an encrypted set of data by associating said data with an image; and a processor coupled to said user computer for receiving and processing said encrypted set of data after said record receives said receiving information;

said record encryting said information when a user inputs said information into a user computer;

wherein said user computer is coupled to said processor via a modem and said record is displayed on said user computer, said processor receiving and processing said encrypted set of data from said user computer via said modem to provide processed information and thereafter transmitting said processed information back to said user computer for display thereon, said user computer being situated remotely from said processor to enable said information to be input and displayed prior to encryption on said user computer and processed in said processor remotely from said user computer.

2. The recording system as recited in claim 1 wherein said processor provides said indicia to said user computer via at least one modem.

3. The recording system as recited in claim 2 wherein said indicia comprise a plurality of labels.

4. The recording system as recited in claim 3 wherein said plurality of labels are electronic labels.

5. The encryption recording system as recited in claim 3 wherein said plurality of labels are generated by said processor.

6. The recording system as recited in claim 1 wherein said information corresponds to at least one image.

7. The recording system as recited in claim 1 wherein said record comprises a plurality of record areas for receiving said information.

8. A method for generating an image corresponding to encrypted data, said method comprising the steps of:

providing a record comprising a plurality of record areas for receiving data associated with an image;

displaying said record on a user computer;

said record formatting and recording said data when said data is received on the record to provide an encrypted set of data; and providing a processor for processing said data remotely from said user computer;

processing said encrypted set of data on said processor remotely from said user computer after said computer transmits said data via a modem to said processor after said record receives said data.

9. The method as recited in claim 8 wherein said processing step further comprises the step of:

electronically de-encrypting said encrypted set of data.

10. The method as recited in claim 8 wherein said providing step further comprises the step of:

electronically providing said record from a processor to a user computer.

11. The method as recited in claim 10 wherein said providing step further comprises the step of:

electronically providing said record from a processor to a user computer via a modem.

12. The method as recited in claim 8 wherein said method further comprises the step of:

generating an electronic image using said encrypted set of data.

13. The method as recited in claim 12 wherein said method further comprises the step of:

using a plurality of electronic indicia in association with said electronic image in order to provide said electronic image.

14. The method as recited in claim 8 wherein said method further comprises the steps of:

transmitting said record from a processor to a user computer;

receiving said encrypted set of data from said user computer using said record.

15. The method as recited in claim 8 wherein said method further comprises the steps of:

processing said encrypted set of data with a processor to provide an image;

electronically transmitting said image to said user computer via a modem.

16. The method as recited in claim 13 wherein said using step further comprises the step of:

using a plurality of electronic labels with said electronic image to provide said electronic image.

17. The method as recited in claim 8 wherein said method further comprises the step of:

generating an image using said set of encrypted data;

situating a plurality of labels in proximity with said image to provide a de-encrypted image.

18. The method as recited in claim 8 wherein said method further comprises the step of:

situating a password onto said record.

19. The method as recited in claim 8 wherein said method further comprises the step of:

using a key or password with said record.

20. The recording system as recited in claim 8 wherein said record comprises a password or key.

21. A recording system comprising:

record means for display at a user computer and for receiving information to format and record the information to provide an encrypted set of data by associating said information with an image;

processing means coupled to said user computer for receiving and processing said encrypted set of data after said record means receives said receiving information; and wherein said user computer is coupled to said processor via a modem and said record is displayed on said user computer, said processor receiving and processing said encrypted set of data from said user computer received via said modem to provide processed information and thereafter transmitting said processed information back to said user computer for display thereon, said user computer being situated remotely from said processor to enable said information to be input and displayed prior to encryption on said user computer and processed in said processor remotely from said user computer.

22. The recording system as recited in claim 21 wherein said processor means provides said indicia to said user computer via at least one modem.

23. The recording system as recited in claim 22 wherein said indicia comprise a plurality of labels.

24. The recording system as recited in claim 23 wherein said plurality of labels are electronic labels.

25. The encryption recording system as recited in claim 23 wherein said plurality of labels are generated by said processor.

26. The recording system as recited in claim 24 wherein said information corresponds to at least one image.

27. The recording system as recited in claim 21 wherein said record means comprises a plurality of record areas for receiving said information.

* * * * *